(12) United States Patent
Chirgwin et al.

(10) Patent No.: US 9,632,275 B2
(45) Date of Patent: Apr. 25, 2017

(54) SECURE JACKET

(71) Applicants: Tyco Electronics Corporation, Berwyn, PA (US); Tyco Electronics UK Ltd., Swindon, Wiltshire (GB)

(72) Inventors: David John Chirgwin, Chester (GB); Paul John Pepe, Clemmons, NC (US)

(73) Assignee: CommScope Technologies LLC, Hickory, NC (US)

( * ) Notice: Subject to any disclaimer, the term of this patent is extended or adjusted under 35 U.S.C. 154(b) by 401 days.

(21) Appl. No.: 13/919,283

(22) Filed: Jun. 17, 2013

(65) Prior Publication Data

US 2013/0335102 A1  Dec. 19, 2013

Related U.S. Application Data

(60) Provisional application No. 61/660,415, filed on Jun. 15, 2012.

(51) Int. Cl.
| | | |
|---|---|---|
| *G01R 31/02* | (2006.01) | |
| *G02B 6/44* | (2006.01) | |
| *H01B 7/32* | (2006.01) | |
| *H02G 3/04* | (2006.01) | |
| *G08B 13/12* | (2006.01) | |

(52) U.S. Cl.
CPC ........... *G02B 6/4469* (2013.01); *H01B 7/328* (2013.01); *H02G 3/0481* (2013.01); *G08B 13/128* (2013.01)

(58) Field of Classification Search
CPC ........ G01R 27/28; G01R 31/21; G01R 31/24; G01R 31/23; G01R 31/2805; G01R 31/2812; H04B 33/46

USPC .......................... 324/539, 513, 537, 538, 543
See application file for complete search history.

(56) References Cited

U.S. PATENT DOCUMENTS

| | | | | |
|---|---|---|---|---|
| 3,610,808 A | | 10/1971 | Horwinski | |
| 4,125,739 A | * | 11/1978 | Bow | H01B 9/022 174/107 |
| 4,365,865 A | * | 12/1982 | Stiles | G02B 6/4416 174/70 R |
| 4,859,989 A | * | 8/1989 | McPherson | G01R 31/021 174/120 SC |

(Continued)

FOREIGN PATENT DOCUMENTS

| | | |
|---|---|---|
| DE | 85 15 470 U1 | 2/1986 |
| WO | WO 2005/114285 A1 | 12/2005 |
| WO | WO 2007/096775 A2 | 8/2007 |

*Primary Examiner* — Tung X Nguyen
*Assistant Examiner* — Dominic Hawkins
(74) *Attorney, Agent, or Firm* — Merchant & Gould P.C.

(57) ABSTRACT

A secured cable system for protecting an inner cable is disclosed. The secured cable system includes a cable security system having a first security tape including a tape portion upon which a plurality of detection lines are arranged. The security system may also include a detection box in electrical or optical communication with each of the detection lines in the first security tape. In one embodiment, the security tape is spiral wrapped about the inner cable in a first direction along a length of the inner cable, the security tape being overlapped upon itself at a predetermined overlap factor. The secured cable system may also include a second security tape including a tape portion upon which a plurality of detection lines are arranged in a pattern wherein the second security tape is wrapped about the first security tape in a second direction opposite the first direction.

28 Claims, 7 Drawing Sheets

(56) References Cited

U.S. PATENT DOCUMENTS

| | | | |
|---|---|---|---|
| 4,862,146 A * | 8/1989 | McCoy | G01M 3/04 174/11 R |
| 5,017,908 A * | 5/1991 | MacPherson | G01M 3/045 174/11 R |
| 5,026,141 A | 6/1991 | Griffiths | |
| 5,077,526 A | 12/1991 | Vokey et al. | |
| 5,165,002 A * | 11/1992 | Cumberledge | G02B 6/4202 250/227.11 |
| 5,203,202 A * | 4/1993 | Spencer | G01M 3/18 73/40 |
| 5,268,971 A | 12/1993 | Nilsson et al. | |
| 5,283,429 A | 2/1994 | Campolo | |
| 5,369,518 A | 11/1994 | Aslami et al. | |
| 5,541,803 A | 7/1996 | Pope, Jr. et al. | |
| 5,557,698 A | 9/1996 | Gareis et al. | |
| 5,708,364 A | 1/1998 | Vokey et al. | |
| 5,841,617 A | 11/1998 | Watkins, Jr. et al. | |
| 5,862,030 A * | 1/1999 | Watkins, Jr. | H02H 5/043 219/494 |
| 5,913,003 A | 6/1999 | Arroyo et al. | |
| 6,169,834 B1 * | 1/2001 | Keller | H01B 11/22 385/101 |
| 6,512,444 B1 | 1/2003 | Morris, Jr. et al. | |
| 6,559,437 B1 | 5/2003 | Pope, Jr. et al. | |
| 6,687,437 B1 | 2/2004 | Starnes et al. | |
| 6,801,117 B2 | 10/2004 | Morris, Jr. et al. | |
| 7,154,081 B1 | 12/2006 | Friedersdorf et al. | |
| 7,277,822 B2 * | 10/2007 | Blemel | G01M 5/0091 324/539 |
| 7,479,878 B2 * | 1/2009 | Maki | G08B 13/124 340/552 |
| 7,755,027 B2 * | 7/2010 | Browning, Jr. | G02B 6/4416 250/227.14 |
| 7,940,055 B2 | 5/2011 | Harres et al. | |
| 8,005,324 B2 | 8/2011 | Bremnes | |
| 8,013,987 B2 | 9/2011 | Huffman et al. | |
| 8,676,010 B2 | 3/2014 | Congdon, II et al. | |
| 8,704,088 B2 * | 4/2014 | Frey | H01B 7/1855 174/36 |
| 9,140,867 B1 * | 9/2015 | Sandate Aguilar | G02B 6/441 |
| 2004/0032329 A1 * | 2/2004 | DeConinck | G08B 13/1472 340/568.4 |
| 2004/0046660 A1 * | 3/2004 | Ando | G08B 13/186 340/545.6 |
| 2004/0071382 A1 * | 4/2004 | Rich | G02B 6/4469 385/12 |
| 2004/0114888 A1 * | 6/2004 | Rich | G02B 6/4469 385/101 |
| 2004/0201390 A1 * | 10/2004 | Farnworth | G01R 1/0466 324/754.08 |
| 2006/0127014 A1 * | 6/2006 | Ledbetter | G02B 6/4494 385/109 |
| 2006/0151656 A1 * | 7/2006 | Gallagher | F16L 55/1652 242/437 |
| 2009/0115607 A1 * | 5/2009 | Beinhocker | G08B 13/126 340/541 |
| 2009/0304322 A1 | 12/2009 | Davies et al. | |
| 2010/0097215 A1 * | 4/2010 | Locher | G08B 13/22 340/550 |
| 2011/0304340 A1 * | 12/2011 | Hall | H04M 3/306 324/533 |
| 2013/0011106 A1 | 1/2013 | Congdon, II et al. | |
| 2013/0187630 A1 * | 7/2013 | Beinhocker | G01N 27/20 324/71.1 |
| 2014/0306014 A1 * | 10/2014 | Salle | H05K 1/0275 235/488 |

* cited by examiner

SECURE JACKET

CROSS REFERENCE TO RELATED APPLICATION

This application claims the benefit of provisional application Ser. No. 61/660,415, filed Jun. 15, 2012, which is incorporated herein by reference in its entirety.

TECHNICAL FIELD

The present disclosure relates to security jackets for cabling systems.

BACKGROUND

Many telecommunications and data communications applications involve the transmission of highly sensitive or confidential information through cables, such as fiber optic cables. In some instances, it is possible for a cable to be breached such that a third party can intercept or otherwise receive the communicated data through the cable. It is additionally possible that when such a breach occurs, that it cannot be detected resulting in the cable owner being unaware that the confidentiality of the transmitted data has been compromised. Although some solutions to this problem have been developed, further improvements are desired, especially for solutions that protect standard telecommunications and data cables.

SUMMARY

A secured cable system for protecting an inner cable is disclosed. The secured cable system includes a cable security system having a first security tape including a tape portion upon which a plurality of first detection lines are arranged on a first side of the tape portion. In one embodiment, the first security tape includes a plurality of second detection lines arranged on a second side of the tape portion. The detection lines may be arranged on each side of the tape in different patterns. The security system may also include a detection box in electrical or optical communication with each of the detection lines in the first security tape. In one embodiment, the security tape is spiral wrapped about the inner cable in a first direction along a length of the inner cable, the security tape being overlapped upon itself. In one embodiment, the security tape is wrapped longitudinally about the inner cable to form a secured cable. The secured cable system may also include a second security tape including a tape portion upon which a plurality of detection lines are arranged in a pattern wherein the second security tape is wrapped about the first security tape in a second direction opposite the first direction. In one embodiment, the detection box is a time domain reflector while in another embodiment the detection box is a continuity detector working in conjunction with a loopback.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
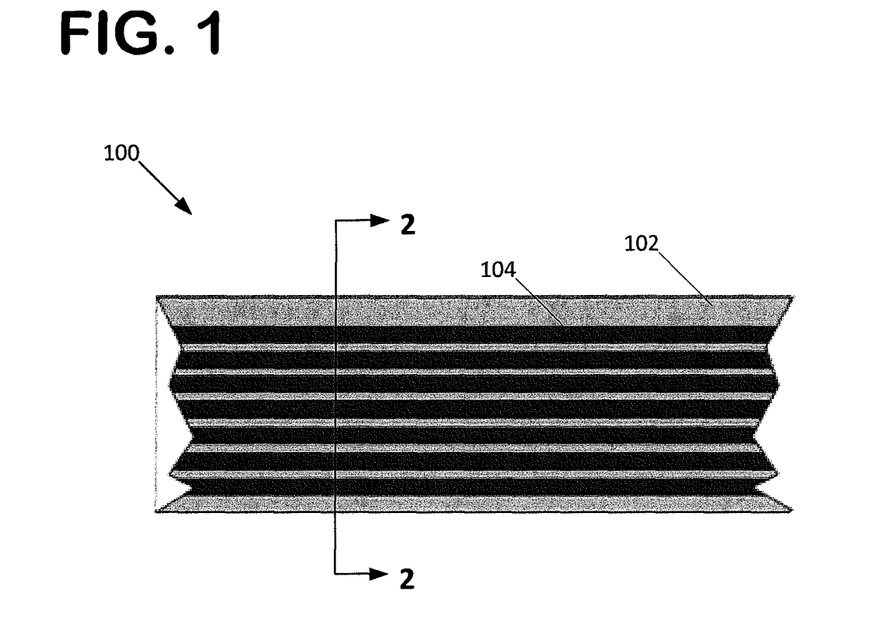
FIG. 1 is a schematic top view of an exemplary security tape that is an example of aspects in accordance with the principles of the present disclosure.
Figure 2:
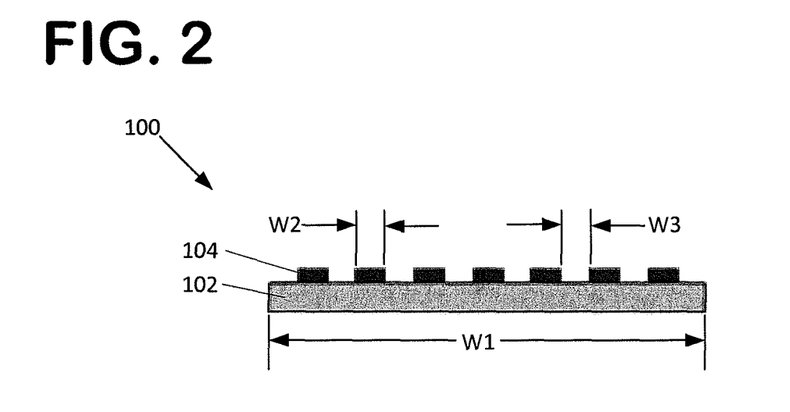
FIG. 2 is a schematic cross-sectional view of the security tape shown in FIG. 3, taken along the line 2-2.

Referring to FIGS. 1 and 2, a security tape 100 is shown. In use, security tape 100 can be wrapped around a cable to form a security jacket layer in a cable security system 200 (discussed later). As shown, the security tape 100 includes a tape portion 102 having a width w1. In one embodiment, tape portion 102 is made from a plastic material. However, other suitable materials may be utilized, such as metallized polyester tape. As seen in FIG. 2, tape portion 102 has a width w1. In one embodiment, width w1 is about 7.5 mm. Other materials and widths may be utilized.

Security tape 100 also includes a plurality of detection lines 104 patterned onto the tape portion 102. In one embodiment, the plurality of detection lines 104 are electrical conductors made from a conductive material, such as FTP foil or metalized film. In one embodiment, the detection lines 104 are optical fibers. In the particular embodiment shown in FIGS. 1 and 2, seven spaced detection lines 104 having a width w2 are patterned onto the tape portion 102 in a straight parallel arrangement. However, it should be understood that the more or fewer detection lines 104 may be used. As shown, the edges of the cables are spaced apart by a width w3. In one embodiment, width w2 is about 0.5 mm and width w3 are about 0.5 mm. Additionally, security tape 100 may have detection lines 104 patterned onto the tape portion 102 in a variety of different patterns, such as a zig-zag pattern and a wavy pattern. Security tape 100 may also be provided with multiple layers of conductors as well, for example, a first of parallel conductors overlying another set of parallel conductors to form a cross-hatched type pattern.

Figure 3:
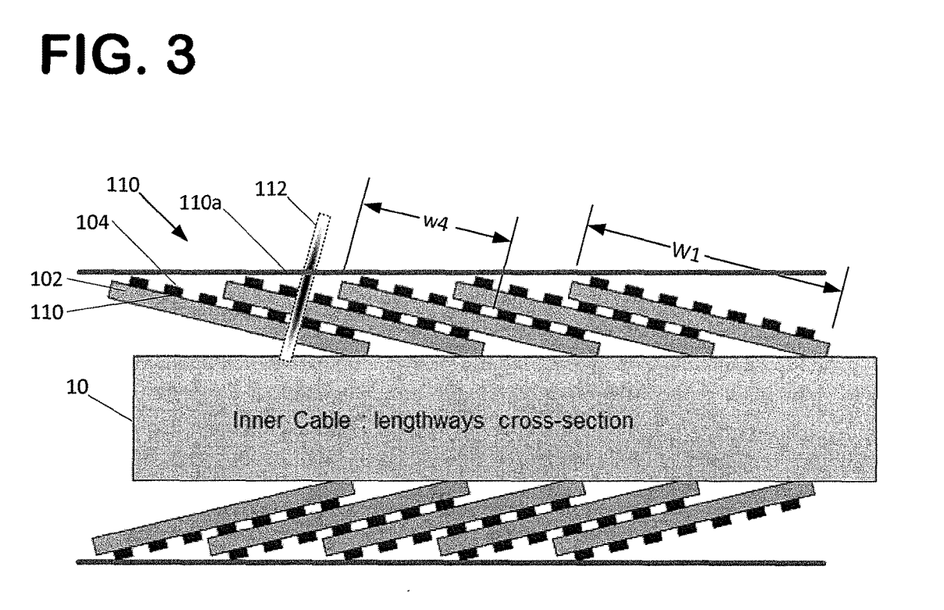
FIG. 3 is a schematic cross-sectional view of the security tape shown in FIG. 1 wrapped around a cable in a first layer to form a security jacket.
Figure 3A:
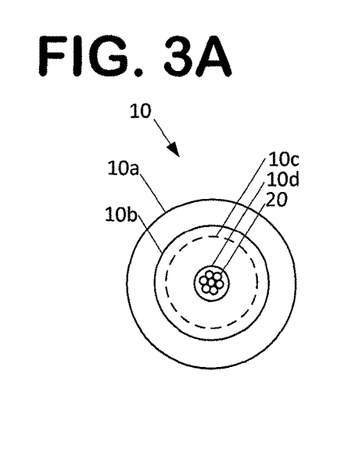
FIG. 3A is a schematic cross-sectional view of the cable shown in FIG. 3.
Figure 3B:
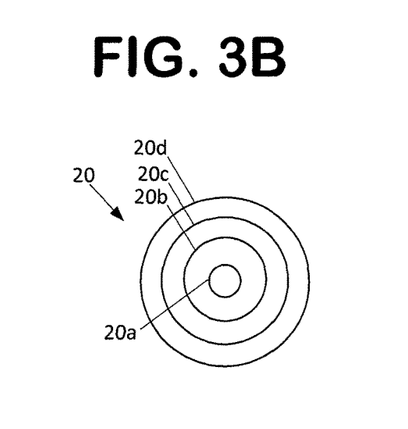
FIG. 3B is a schematic cross-sectional view of a fiber-optic from within the cable shown in FIG. 3A.

Referring to FIG. 3, the security tape 102 is schematically shown wrapped about an inner cable 10 to form a security jacket 110. Inner cable 10 may be any type of cable that is desired to be protected, for example, telecommunications cables and data cables having a signal conveying member (s), such as optical fibers, copper wire, metal wire, and twisted pair cables. One example of an inner cable 10 is shown at FIG. 3A. As shown, inner cable 10 has a jacket 10a, a strengthening layer 10b, an aramid cladding layer 10c, a buffer tube 10d, and a plurality of optical fibers 20. Referring to FIG. 3B, an example of an optical fiber 20 is shown. As shown, optical fiber 10 has a core 20a, a cladding layer 20b, a coating/acrylate later 20c, and a jacket 20d. Many other types of cables are usable with the concepts disclosed herein.

As shown in FIG. 3, the security jacket 110 wraps completely around the inner cable 10 in a spiral or helical arrangement. Because the plurality of detection lines 104 are patterned onto the tape 102 and wrapped about the inner cable 10, the detection lines 104 cover the majority of the outer surface area of the inner cable 10. Although discussed later in more detail later, when unauthorized access into the inner cable 10 from the outside is attempted one or more of the detection lines 104 is broken thereby resulting in a loss in continuity or a detected change in a line/signal characteristic through that particular detection line 104. The disclosed arrangement is useful in detecting many types of intrusions into inner cable 10, for example, a cross-cut entirely through the inner cable 10, an abrasion along the inner cable 10, a partial cut with a rough edge (e.g. a saw, a rodent's teeth, etc.) into inner cable 10, and a partial cut with a smooth edge (e.g. a knife, a scalpel, etc.).

Figure 4:
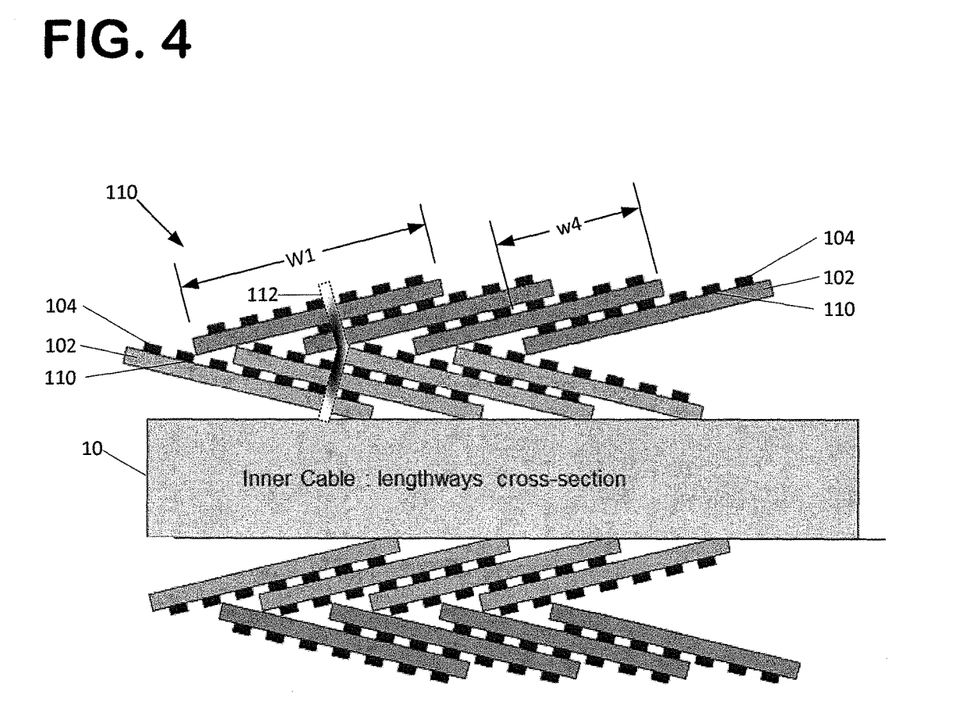
FIG. 4 is a schematic cross-section of the security tape shown in FIG. 3 wrapped around the cable to form a second layer.

As shown, the security tape 100 is wrapped about inner cable 10 at an overlap factor. By use of the term "overlap factor" it is meant to identify the percentage of the width w1 of the security tape 100 that is covered by an adjacent layer of the security tape 100. As shown in FIG. 4, the adjacent layers of security tape 100 cover each other by a width w4. Accordingly, the overlap factor can be expressed as the width w4 divided by the width w1 multiplied by 100. In the particular embodiment shown, the overlap factor is about 75%. An overlap factor of at least 50% would ensure that the inner cable 10 is covered by at least two layers of security tape 100 along the length of the inner cable 10. Depending upon the pattern of detection lines 104 and the overlap factor of the security tape 100, the number and size of intrusion windows 112 through the security jacket 110 into the inner cable 10 can be limited. Intrusion windows 112 are any pathways that allow access into inner cable 10, and that would not cause any of the detection lines 104 to be damaged or broken. For example, in the arrangement shown in FIG. 3, a needle or a similarly shaped tool may be threaded into inner cable 10 via intrusion window 112. Accordingly, where the detection lines 104 are patterned in a dense arrangement onto the tape portion 102, and where the overlap factor is high, the intrusion windows 112 will be minimized.

Referring to FIG. 4, the security tape 100 is shown as being wrapped a second time in the reverse direction about inner cable 10. However the security tape 100 may be wrapped to form a second layer in the same direction as the first layer, or may be wrapped longitudinally along the length of the inner cable 10. The second layer may be the same security tape 100 wrapped back onto the first layer or may be a second, separate security tape 100. This arrangement further reduces the available intrusion windows 112 for access into inner cable 10. As can be seen, the intrusion window 112 in FIG. 4 no longer provides for a direct, straight pathway into inner cable 10, thereby preventing a straight tool from accessing inner cable 10 without detection. Additionally, the detection line 104 pattern, width, and spacing; the number of security tape 100 layers; and the overlap factor may be chosen such that 100% of the outer surface of the inner cable 10 is covered such that no direct intrusion window 112 exists. Additional layers of security tape 100 are also possible. It is also noted, that any intrusion by a tool or object having a minimum dimension greater than width w3 will be detected regardless of the number of layers utilized because at least one detection line 104 will be necessarily damaged or broken.

Furthermore, the arrangement and location of the detection lines 104 can be obscured, such as by embedding them within tape portion 102, or by placing the detection lines 104 between the inner cable 10 and the tape portion 102. Such an arrangement increases the difficulty of intrusion without detection. Similarly, the security jacket 110 may further include an outer sheath 110a, as shown in FIG. 3. Outer sheath 110a may be a PVC sheath and can be configured to obscure and protect the security tape 100 from damage after being installed.

Figure 5:
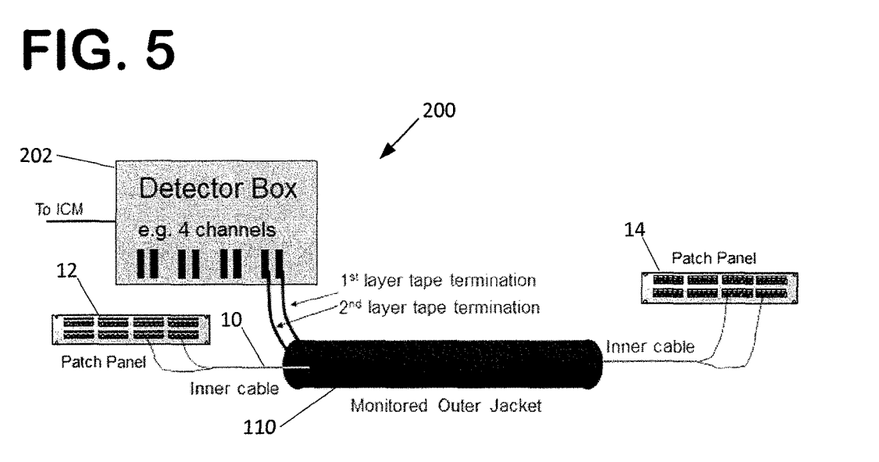
FIG. 5 is a schematic side view of a first embodiment of a cable security system including a security tape.

Referring to FIG. 5, a first embodiment of a cable detection system 200 is shown. As stated previously, cable detection system 200 is for detecting an intrusion into the inner cable 10. In the exemplary embodiment shown, cable detection system 200 includes a security jacket 110 having two layers of security tape 100 wrapped about the inner cable 10 in the same general manner shown in FIG. 4. Additionally, this configurations shows that the two layers are formed from separate segments of tape 100a, 100b. The inner cable 10 is shown as having a plurality of individual cables 10 connected to a first patch panel 12 at one end and a second patch panel 14 at a second end. The patch panels 12, 14 may be any type of panel or connection, such as patch panels for standard optical fibers or copper product.

Cable detection system 200 also includes a detection box 202 to which the security tape segments 100a, 100b are connected. The detection box 202 is for detecting a break in continuity or signal in any of the detection lines 104 in the security jacket 110. In one embodiment, the detection box 202 is configured to support multiple security jackets 110. As shown, detection box 202 is configured with four channels to support up to four pairs of security tapes 100. The detection box 202 may also be configured to link to an ICM that has software for network signal management and alarm handling. Where the detection box 202 supports multiple security tapes 100 or jackets 110, the detection box 202 can be configured to continuously monitor each connection. Alternatively, detection box 202 can be configured to test each connection or channel one at a time on a rotating or cycling basis. Such a configuration would reduce the number of active monitoring components needed in detection box 202. This rotation may be on a cable-by-cable basis or on a security tape-by-security tape basis.

Figure 6:
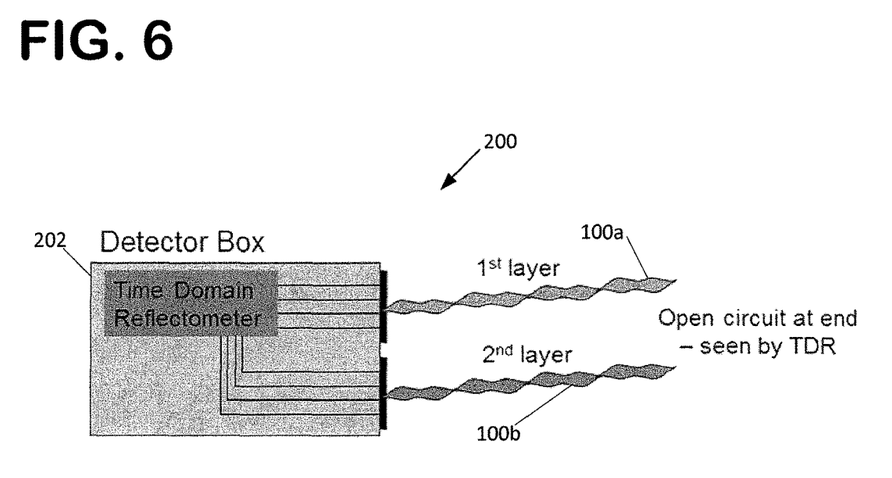
FIG. 6 is a schematic view of a detector box and security tape usable in the security system shown in FIG. 5.

Referring to FIG. 6, the detection box 202 is configured as a time domain reflector that first identifies a characteristic trace for each security tape 100 based on the open circuit at the far end for each detection line 104 in the security tape 100. The detector box 202 accomplishes this by sending a short rise time pulse through each detection line 104 and recording the reflection characteristics of the detection line 104. Once a characteristic trace has been identified, the detection box 202 can send and compare subsequent pulses through each detection line 104. Where subsequent pulse trace characteristics do not sufficiently match the initially identified characteristic, an intrusion event will be identified by the detection box 202 and an alarm will be generated. Additionally, time domain reflection also allows for an estimation of the distance to the intrusion event along the detection line 104 because the reflection characteristic change can be identified at a specific location along the length of the line. Taking into account the length of detection line 104 consumed in spiral wrapping, the location of the intrusion event with respect to the inner cable 10 can also be estimated. In many instances, the accuracy for location detection is within a few meters, and in some instances within one meter. Where detection lines 104 are fiber optic cables, the detection box 202 may be an optical time domain reflector. This configuration is also easily multiplexed with many security jackets 110 being able to be monitored through a single detection box 202.

Figure 7:
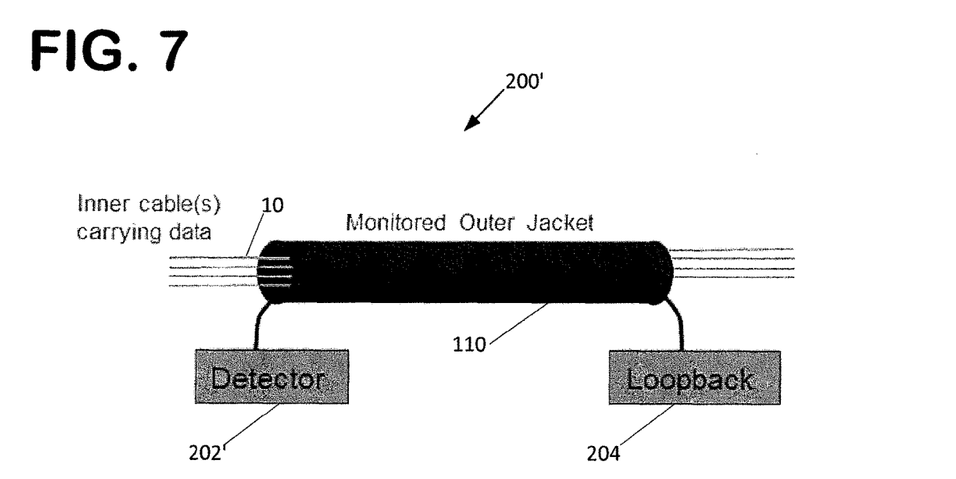
FIG. 7 is a schematic side view of a second embodiment of a cable security system including a security tape.
Figure 8:
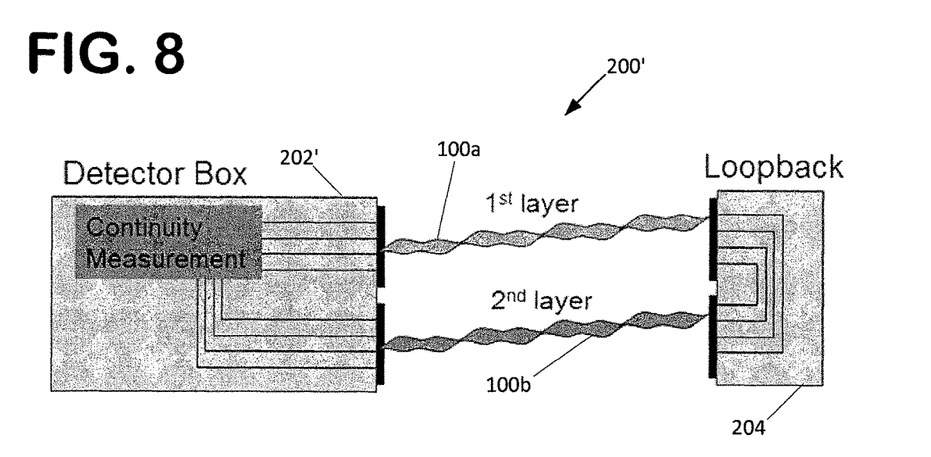
FIG. 8 is a schematic view of a detector box and security tape usable in the security system shown in FIG. 7.

Referring to FIGS. 7 and 8, a second embodiment of a cable security system 200' is presented. As many of the concepts and features are similar to the first embodiment shown in FIGS. 5-6, the description for the first embodiment is hereby incorporated by reference for the second embodiment, and vice-versa. Where like or similar features or elements are shown, the same reference numbers will be used where possible. The following description for the second embodiment will be limited primarily to the differences between the first and second embodiments.

Instead of utilizing a time domain reflector, the second embodiment shown in FIGS. 7-8 utilizes a continuity measurement circuit. This is accomplished by connecting the first and second layers 102a, 102b of security tape 100 at their far ends (conductor by conductor) with a loopback 204, and configuring detection box 202' as a continuity detector. In such a configuration, the detection box 202' monitors continuity, on a rotating basis or continuously, for each detection line 104. A shown, detection box 202' has four channels, but may have more or fewer channels depending upon application. Detection box 202' may also be an optical fiber continuity detector.

Where the detection box 202' detects a loss in continuity in any of the detection lines 104, an intrusion event will be identified by the detection box 202' and an alarm will be generated. As with the first embodiment, this configuration is also easily multiplexed with many security jackets 110 being able to be monitored through a single detection box 202'. It is also noted that FIG. 7 shows the security jacket 110 protecting a plurality of inner cables 10, and is not limited to protecting only a single inner cable 10, as is also the case with the first embodiment.

Referring to FIGS. 9-12, a second embodiment of a security tape 100' is presented. As many of the concepts and features are similar to the first embodiment shown in FIGS. 1-2, the description for the first embodiment is hereby incorporated by reference for the second embodiment, and vice-versa. Where like or similar features or elements are shown, the same reference numbers will be used where possible. The following description for the second embodiment will be limited primarily to the differences between the first and second embodiments.

Figure 9:
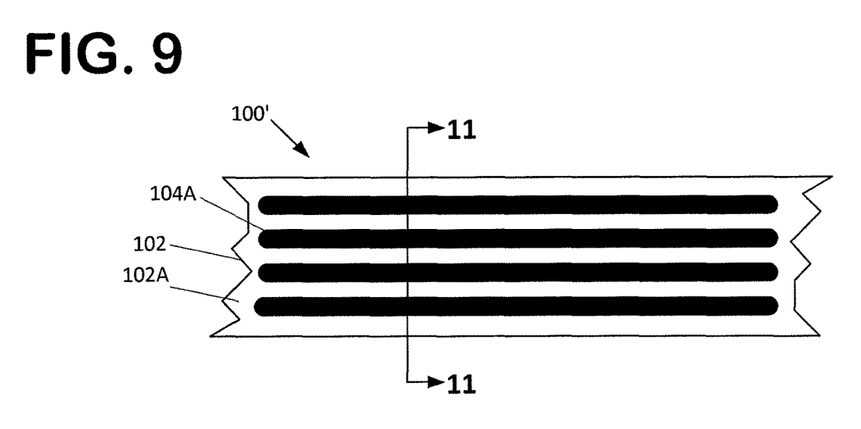
FIG. 9 is a schematic top view of a second embodiment of a security tape that is an example of aspects in accordance with the principles of the present disclosure.

Referring to FIG. 9, the security tape 100' is provided with a plurality of first detection lines 104A oriented onto a top side 102A of the tape portion 102 in a pattern. In one embodiment, the plurality of first detection lines 104 are electrical conductors made from a conductive material, such as FTP foil or metalized film. In one embodiment, the plurality of first detection lines 104A are optical fibers. In the particular embodiment shown, four spaced first detection lines 104A are oriented onto the tape portion 102 in a parallel arrangement. However, it should be understood that the more or fewer detection lines 104A may be used, and that the orientation of the lines 104A may be different from the parallel pattern shown.

Figure 10:
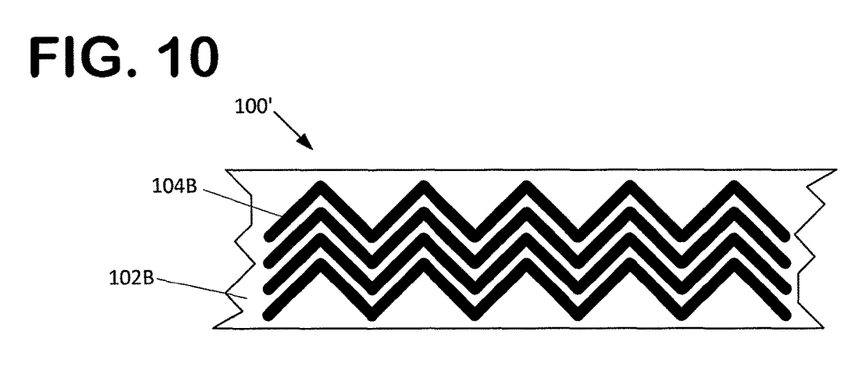
FIG. 10 is a schematic bottom view of the security tape shown in FIG. 9.

Referring to FIG. 10, the security tape 100' is provided with a plurality of second detection lines 104B patterned onto a bottom side 102B of the tape portion 102. In one embodiment, the plurality of second detection lines 104B are conductors made from a conductive material, such as FTP foil or metalized film. In one embodiment, the plurality of second detection lines 104A are optical cables. In the particular embodiment shown, four spaced second detection lines 104A are patterned onto the tape portion 102 in a zigzag pattern. However, it should be understood that the more or fewer detection lines 104A may be used, and that the pattern may be different from a zigzag pattern.

Figure 11:
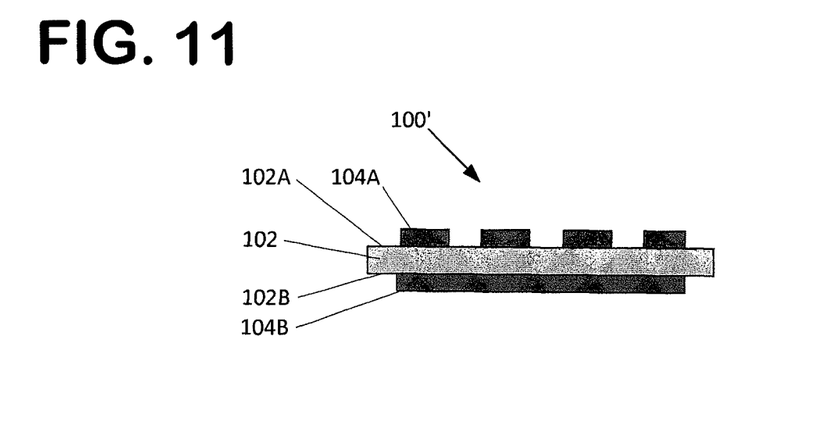
FIG. 11 is a schematic cross-sectional view of the security tape shown in FIG. 9, taken along the line 11-11.
Figure 12:
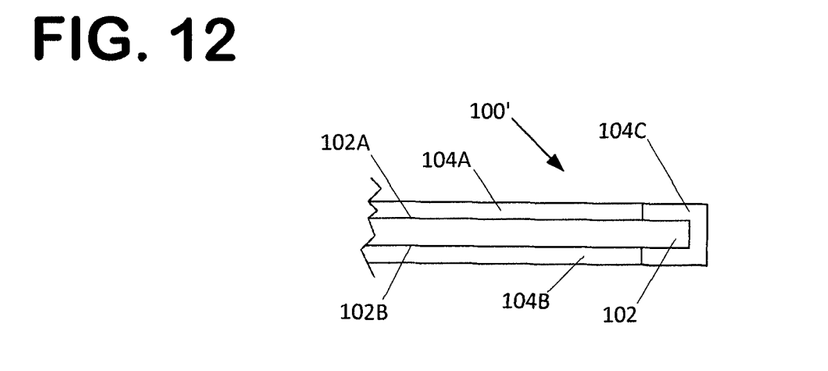
FIG. 12 is a schematic side view of an end portion of the security tape shown in FIG. 9.
Figure 13:
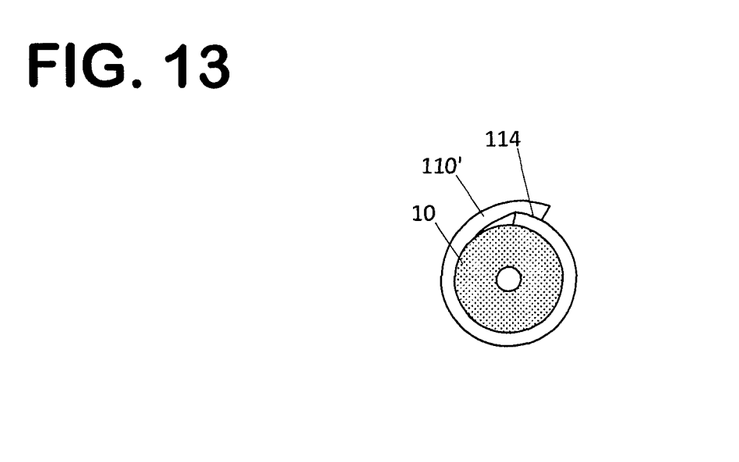
FIG. 13 is a schematic cross-sectional view of the security tape shown in FIG. 9 being longitudinally wrapped along an inner cable.

Referring to FIG. 11, a cross-sectional view of the security tape 100' is shown wherein the first detection lines 104A and the second detection lines 104B can be viewed together. In the particular embodiment shown, the number of first detection lines 104A is equal to the number of second detection lines 104B. However, it is noted that the number of detection lines 104A may be different than the number of detection lines 104B. For example, there may be seven detection lines 104A provided on the top side 102A of the tape portion 102 and four detection lines 104B provided on the bottom side 102B of the tape portion 102.

Where the number of detection lines 104A and 104B are equal, each of the first detection lines 104A may be connected to a corresponding second detection line 104B by a cable bridge section 104C at a distal end 102C of the tape portion, as shown in FIG. 12. This approach is useful in cable security systems 200 utilizing a continuity sensing detection box 202'. In such an arrangement, the bridge section 104C may pass through the tape portion, or as shown, may wrap around the distal end 102C of the tape portion. It is noted that each first detection line 104A, bridge section 104C, and second detection line 104B may be formed from a single length of continuous cable. Alternatively, the bridge section 104C may be a separate component linking two separate lengths of cable 104A, 104B to form a loopback.

Where security tape 100' is used to form a cable security jacket 110', the intrusion window limiting effect of a two-layer wrapping approach can be obtained with a single spiral wrapped layer of security tape 100'. Alternatively, and as shown in FIG. 13, the security tape 100' may be wrapped longitudinally along the length of the inner cable 10. Where two different patterns are utilized, the intrusion windows 112 are still minimal even without spiral wrapping. It is also noted, that security tape 100' can be configured with a parallel detection line pattern provided on each side of the tape portion 102, wherein the first and second cables are laterally offset from each other. Where the spacing between the detection lines 104 is equal to or less than the width of the detection lines, such an arrangement can entirely eliminate the intrusion windows 112 altogether. Additionally, with reference to FIG. 13, the side edges of the tape 100' may be provided with an adhesive 114 such that the security tape 100' can be secured to itself by overlapping the side edges.

Where cable security systems 200, 200' of the types shown in FIGS. 5-7 are utilized with security tape 100', the referenced first and second layers in those figures correspond to the first detection lines 104A and second detection lines 104B of a single layer of security tape 100'. Also, the security tape 100' is compatible with a time domain reflection detection box 202' or a continuity type detection box 202'. In the latter case, a loopback 204 or a bridge section 104C would be utilized to connect the first detection lines 104 A to the second detection lines 104B.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A secured cable system comprising:
   (a) a secured telecommunications or data inner cable having an outer jacket surrounding a signal conveying member;
   (b) a cable security system comprising:
      i. a first security tape including a tape portion upon which a plurality of spaced detection lines are arranged; and
      ii. a detection box in electrical or optical communication with each of the detection lines in the first security tape;
      iii. wherein the first security tape is spiral wrapped about the inner cable in a first direction along a length of the inner cable, the security tape portion being overlapped upon itself such that at least some of the plurality of detection lines are overlapping in the first direction.

2. The secured cable system of claim 1, wherein the detection lines are arranged in a parallel relationship onto the tape portion.

3. The secured cable system of claim 2, wherein a spacing between the detection lines is about 5 millimeters.

4. The secured cable system of claim 1, wherein the detection lines are electrical conductors.

5. The secured cable system of claim 1, wherein the detection lines are fiber optic cables.

6. The secured cable system of claim 1, wherein the detection box is a time domain reflector.

7. The secured cable system of claim 1, wherein at least about 75% of a width of a segment of the security tape is covered by an adjacent overlapping layer of the security tape.

8. The secured cable system of claim 1, wherein the cable security system includes a second security tape including a tape portion upon which a plurality of detection lines are arranged, the second security tape being wrapped about the first security tape in a second direction opposite the first direction.

9. The secured cable system of claim 8, wherein the detection box is a time domain reflector.

10. The secured cable system of claim 8, further comprising a loopback that places the first security tape detection lines in electrical or optical communication with the second security tape detection lines.

11. The secured cable system of claim 10, wherein the detection box is a continuity detector.

12. A cable security system for protecting an inner cable, the cable security system comprising:
   (a) a security tape configured to be spiral wrapped about the inner cable, the inner cable being a telecommunications or data cable having an outer jacket surrounding a signal conveying member, the security tape including a tape portion wherein:
      i. a plurality of spaced first detection lines are arranged in a first pattern and affixed to a top side of the tape portion;
      ii. a plurality of spaced second detection lines are arranged in a second pattern and affixed to a bottom side of the tape portion;
   (b) a detection box in electrical or optical communication with each of the first and second detection lines in the first security tape.

13. The cable security system of claim 12, wherein the first detection lines are arranged in a straight parallel pattern onto the top portion of the tape portion.

14. The cable security system of claim 13, wherein the second detection lines are arranged in a zigzag pattern onto the bottom portion of the tape portion.

15. The cable security system of claim 12, wherein the number of first detection lines is equal to the number of second detection lines.

16. The cable security system of claim 15, wherein each of the first detection lines is connected to one of the second detection lines.

17. The cable security system of claim 12, wherein the first and second detection lines are electrical conductors.

18. The cable security system of claim 12, wherein the first and second detection lines are fiber optic cables.

19. The secured cable system of claim 12, wherein the detection box is a time domain reflector.

20. The secured cable system of claim 12, wherein the detection box is a continuity detector.

21. A secured cable comprising:
   (a) an inner secured telecommunications or data cable having an outer jacket surrounding a signal conveying member; and
   (b) a first security tape comprising:
      i. a first tape portion;
      ii. a first plurality of spaced detection lines arranged onto the first tape portion, the first plurality of detection lines being configured for electrical or optical communication with a detection box;
   (c) wherein the first security tape is helically wrapped about the inner cable in a first direction such that the tape portion is overlapped upon itself along a length of the inner cable such that at least some of the first plurality of detection lines are overlapping in the first direction.

22. The secured cable of claim 21, wherein the first security tape further comprises a second plurality of detection lines arranged onto the first tape portion.

23. The secured cable of claim 22, wherein the first plurality of detection lines are arranged on a first side of the first tape portion and the second plurality of detection lines are arranged on a second side of the first tape portion.

24. The secured cable of claim 23, wherein the first plurality of detection lines are arranged in a straight parallel orientation and the second plurality of detection lines are arranged in a zigzag orientation.

25. The secured cable of claim 22, wherein an equal number of first and second detection lines are provided on the tape portion.

26. The secured cable of claim 25, wherein each of the first detection lines is in electrical or optical communication with one of the second detection lines.

27. The secured cable of claim 21, wherein the inner cable is covered by at least two overlapped layers of security tape along a length of the inner cable.

28. The secured cable of claim 21 further comprising:
(a) a second security tape comprising:
   i. a second tape portion;
   ii. a second plurality of detection lines arranged onto the second tape portion, the second plurality of detection lines being configured electrical or optical communication with the detection box;
(b) wherein the second security tape is helically wrapped about the first security tape in a second direction opposite to the first direction.

\* \* \* \* \*